United States Patent [19]

Stella

[11] Patent Number: 4,779,110
[45] Date of Patent: Oct. 18, 1988

[54] WET FILM CASSETTE AND TRANSPORT SYSTEM

[75] Inventor: Joseph A. Stella, Peabody, Mass.

[73] Assignee: Polaroid Corporation, Cambridge, Mass.

[21] Appl. No.: 922,328

[22] Filed: Oct. 23, 1986

[51] Int. Cl.$^4$ ............... G03B 17/26; G03B 17/50
[52] U.S. Cl. .................................. 354/88; 354/275; 354/211; 354/318; 242/71.1
[58] Field of Search ............... 354/86, 87, 88, 212, 354/301, 303, 318, 211, 214, 275; 242/71.1, 71.2, 71.7, 197

[56] References Cited

U.S. PATENT DOCUMENTS

| | | | |
|---|---|---|---|
| 3,043,534 | 6/1962 | Hejnochowicz | 242/71.1 |
| 3,159,357 | 12/1964 | Berlings | 242/71.1 |
| 3,249,031 | 5/1966 | Gold | 354/318 |
| 3,424,072 | 1/1969 | Hodgson et al. | 354/211 |
| 4,630,912 | 12/1986 | Whiteside | 354/275 |
| 4,630,915 | 12/1986 | Whiteside et al. | 354/275 |

*Primary Examiner*—A. A. Mathews
*Attorney, Agent, or Firm*—David R. Thornton

[57] ABSTRACT

A wet film cassette and transport system for photographic diffusion transfer films having initially separate wet and dry film components. At least the wet component is contained in a tightly sealed enclosure defined by a cassette having inner and outer, relatively rotatable receptacles. Each of the receptacles is provided with a peripheral axially oriented slot, a leading end portion of the wet film projecting at all times through the slot of the inner receptacle but being capable of retraction into an annulus between the inner and outer receptacles by relative rotation of the two receptacles. Retracting movement of the inner receptacle moves a sealing pad carried thereon to a position closing the slot opening of the outer receptacle. When the pad is moved from the slot of the outer receptacle by rotation of the inner receptacle, the leading end portion of the wet film projects through both openings to the nip of a processing roller pair at which the wet film component is brought into face-to-face contact with an exposed dry or negative film component. Cut-off means are provided between the wet film cassette and the processing roller pair whereas image frame lengths of the dry component are separated from the supply thereof independently of the wet film cut-off mechanism. Alternatively, the dry film may be separated through the provision of transverse tear strips in the negative film component or by a separate cut-off mechanism.

23 Claims, 5 Drawing Sheets

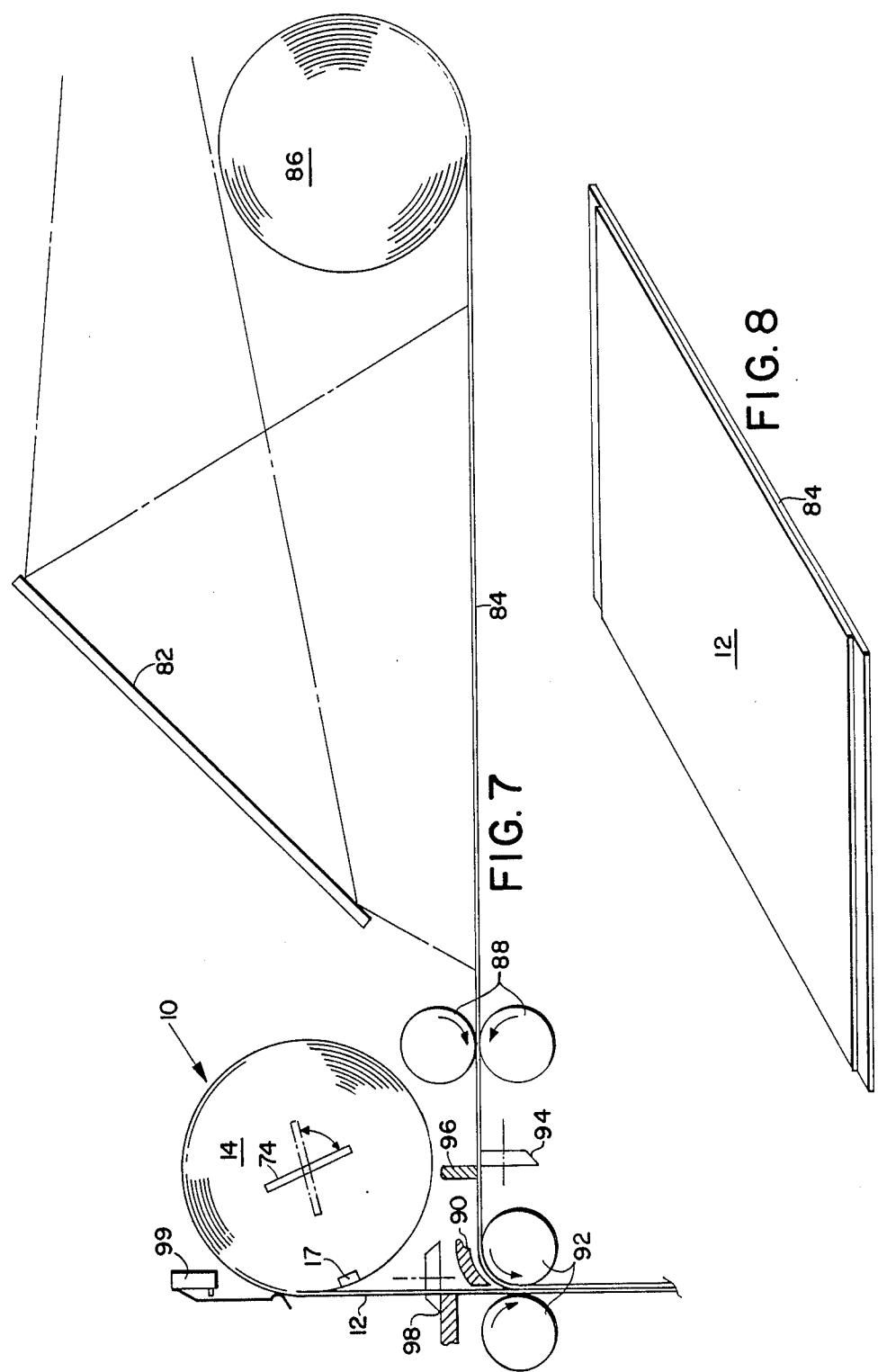

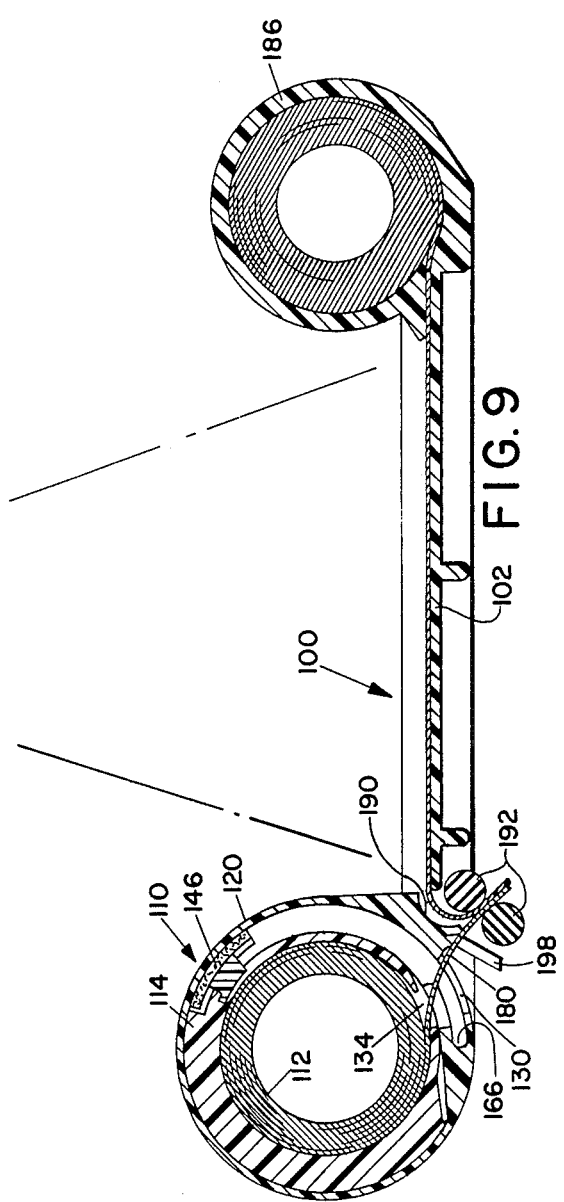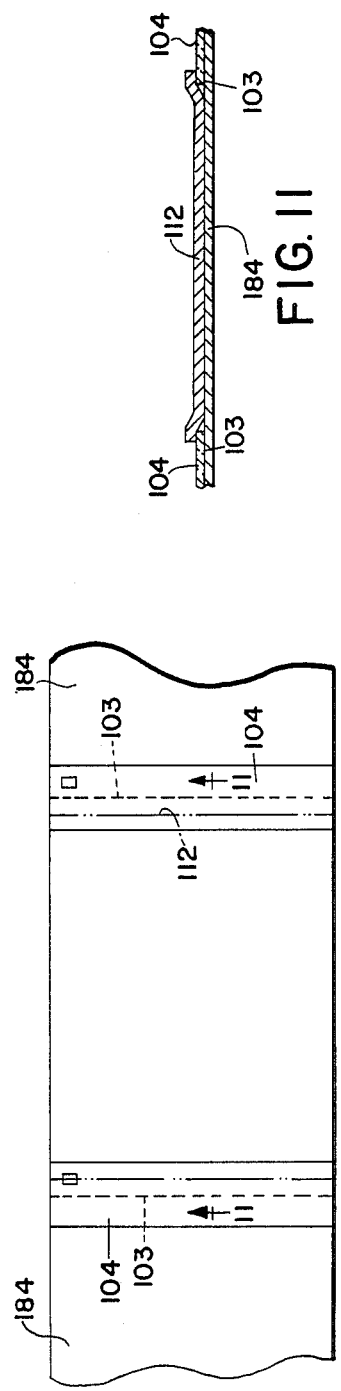

WET FILM CASSETTE AND TRANSPORT SYSTEM

BACKGROUND OF THE INVENTION

This invention relates to photographic film cassette and camera systems employing same. More particularly, it concerns an improved cassette structure for retaining and handling a liquid impregated film component of a film system adapted for diffusion transfer processing.

Commonly assigned U.S. Pat. No. 3,907,563 issued to Edwin H. Land on Sept. 23, 1975 discloses a diffusion transfer process in which the image receiving element or sheet is impregnated with an alkaline processing composition. The image receiver or positive sheet includes a transparent support through which the final image may be observed in an image receiving coating or layer directly on the transparent support. Reflectivity for use of the sheet as a positive print is provided by a white pigmented layer backed by an opaque layer. The three layers thus provided on the transparent support are impregnated with a liquid alkaline processing agent common to diffusion transfer film processing.

The negative element of the system disclosed in the aforementioned patent includes a support of mylar or similar material which may be either transparent or opaque. The negative support is coated by polymeric acid layer, a timing layer, a dye developer layer and finally a silver halide layer. After exposure of the silver halide layer on the negative, the two sheets are brought together in intimate face-to-face contact as a laminate with the several coatings situated between the respective negative and positive sheet supports. The processing agent operates to transfer the latent image formed by exposure of the silver halide layer of the negative to the image-receiving layer directly behind the transparent support of the receiver sheet. The acid layer in the original negative sheet neutralizes the alkaline processing fluid but under the control of the timing interlayer situated between the acid layer and the remaining layers of the composite laminate.

The diffusion transfer system disclosed in U.S. Pat. No. 3,907,563 is especially attractive from the standpoint of attaining high quality photographs with virtually no provision for assuring uniformity of processing fluid spread between the respective negative and positive elements other than impregnation of the positive element during manufacture. In this respect, it is to be noted that in substantially all commercially available diffusion transfer film systems, the alkaline processing fluid is initially contained by a rupturable pod, carried as a component of the film assembly, to be spread between the negative and positive elements of the film assembly after negative exposure. The uniformity of this spread requires precision not only in the processing apparatus which is incorporated as a part of a camera or equivalent, but also a sophisticated and expensive combination of elements in the film sheet assembly, itself.

While a film system of the type disclosed in U.S. Pat. No. 3,907,563 has potential for significant reduction in costs over current diffusion transfer systems, particularly in the manufacture of film, use of such film on a commercial basis is not without problems. Because of the strongly alkaline character of the processing agent and the need for its neutralization after processing, the components carrying the processing agent and the neutralizing acid layer must be kept separate until the processing step is performed. Also, it is important that the liquid processing agent in the positive sheet element be kept from evaporation and that the pH level of the liquid be maintained. Moreover, these conditions must be maintained not only for the normal shelf life of commercial photographic film but also after the film is loaded into a camera and stored in the camera.

In two co-pending U.S. applications, Ser. No. 747,899 entitled "Wet Process Web Camera and Method" by the inventor, George D. Whiteside, now U.S. Pat. No. 4,630,912, and Ser. No. 747,901 entitled "Multi-Part Cassette for Two Component Film System" by the inventors, George D. Whiteside et at, now U.S. Pat. No. 4,630,915, on June 24, 1985, the aforementioned problems are addressed by the provision of a cassette system in which separate chambers are provided on opposite ends of a central tray-like section and to receive the respective negative and positive elements of the film system. The central tray-like section serves to retain the negative element of the system in an exposure plane and also, the positive chamber is equipped with a releasable stopper to ensure that the positive element, coated or otherwise wetted with a liquid processing agent, is hermetically encapsulated at all times other than during passage of the positive element from the chamber.

While the basic cassette organization disclosed in these co-pending applications shows great potential for commercial adaptation of the described two component film system, the problems associated particularly with assuring a sealed enclosure for the liquid impregnated or wet film component fall short of a total solution. For example, the requirement that a leading end portion of the wet film extend past the closed stopper not only involves a compromise of the sealing of the wet film component, but also results in evaporation of the liquid processing agent from the leading portion of the wet film projecting past the stopper. Also, contact with the wet film by the stopper gives rise to possible marking of the wet film and interferes with total sealing due to difficulties in making the pliant stopper seal about the edges of the film. In addition, structural components required to load and retain a coil of the wet film component in the stoppered enclosure was more complex and expensive than desirable for a one-use or disposable cassette structure. There is a need, therefore, for further improvement in the wet film enclosing and handling portion of the prior system.

SUMMARY OF THE INVENTION

In accordance with the present invention, at least the wet film in a two component diffusion transfer film system is enclosed at all times other than during a processing cycle in a tightly sealed enclosure constructed to effect projection of a leading end portion of the wet film from the enclosure at the initiation of a processing cycle and retraction of the projecting portion of the wet film remaining at the end of the processing cycle back into the enclosure prior to sealing thereof.

The wet film enclosure is defined by a cassette having relatively rotatable inner and outer generally cylindrical receptacles having respective peripheral slot openings which may be brought into registration to enable passage of the film from the cassette. The inner receptacle carries an elastomeric sealing pad displaced from the slot opening in the direction of film feeding by a peripheral or circumferential distance slightly greater the length of the wet film leading end portion required for projection from the cassette to the nip of a processing roller pair. Thus, after each processing cycle and severance of the used or processed portion of the wet film from the cassette contained supply, the inner receptacle is rotated to retract the projecting portion of the wet film into the outer receptacle upon movement of the sealing pad into registry with the slot opening in the outer receptacle. The cassette is initially loaded by simply inserting a clock sprung coil of the wet film into an open end of the inner receptacle with a leading end portion of the film projecting through the slot opening in that receptacle. The loaded inner receptacle is then telescoped into an open end of the outer receptacle until a peripheral seal near the closed end of the inner receptacle engages the inside of the outer receptacle near the open end thereof. The assembled receptacles are indexed by stops for relative rotation between closed and open positions. The film enclosure may also be applied to any film component including the negative film component of a two component diffusion transfer system.

A principal object of the present invention, therefore, is the provision of an improved photographic film cassette for handling particularly the wet film component of a two component film system. Another object of the invention is the provision of a film transport and camera system employing the improved cassette structure. A still further object of the invention is the provision of a wet film component cassette which may be used as a separate component in a system equipped to independently supply a dry negative component, or which may be adapted to an integral cassette in which both the wet and dry film components are packaged in the same cassette structure. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 7 is a schematic view illustrating a film transport system using the embodiment illustrated in FIGS. 1-6;

FIG. 8 is an isometric view illustrating a processed film assembly resulting from the embodiment illustrated in FIG. 7;

FIG. 9 is a longitudinal cross section illustrating an integral two component film cassette employing the wet film cassette structure of the present invention;

FIG. 10 is a fragmentary plan view illustrating a segment of the film used with the embodiment of FIG. 9; and FIG. 11 is a cross section on line 11—11 of FIG. 10.

DETAILED DESCRIPTION OF THE PREFERRED EMBODIMENTS

Figure 1:
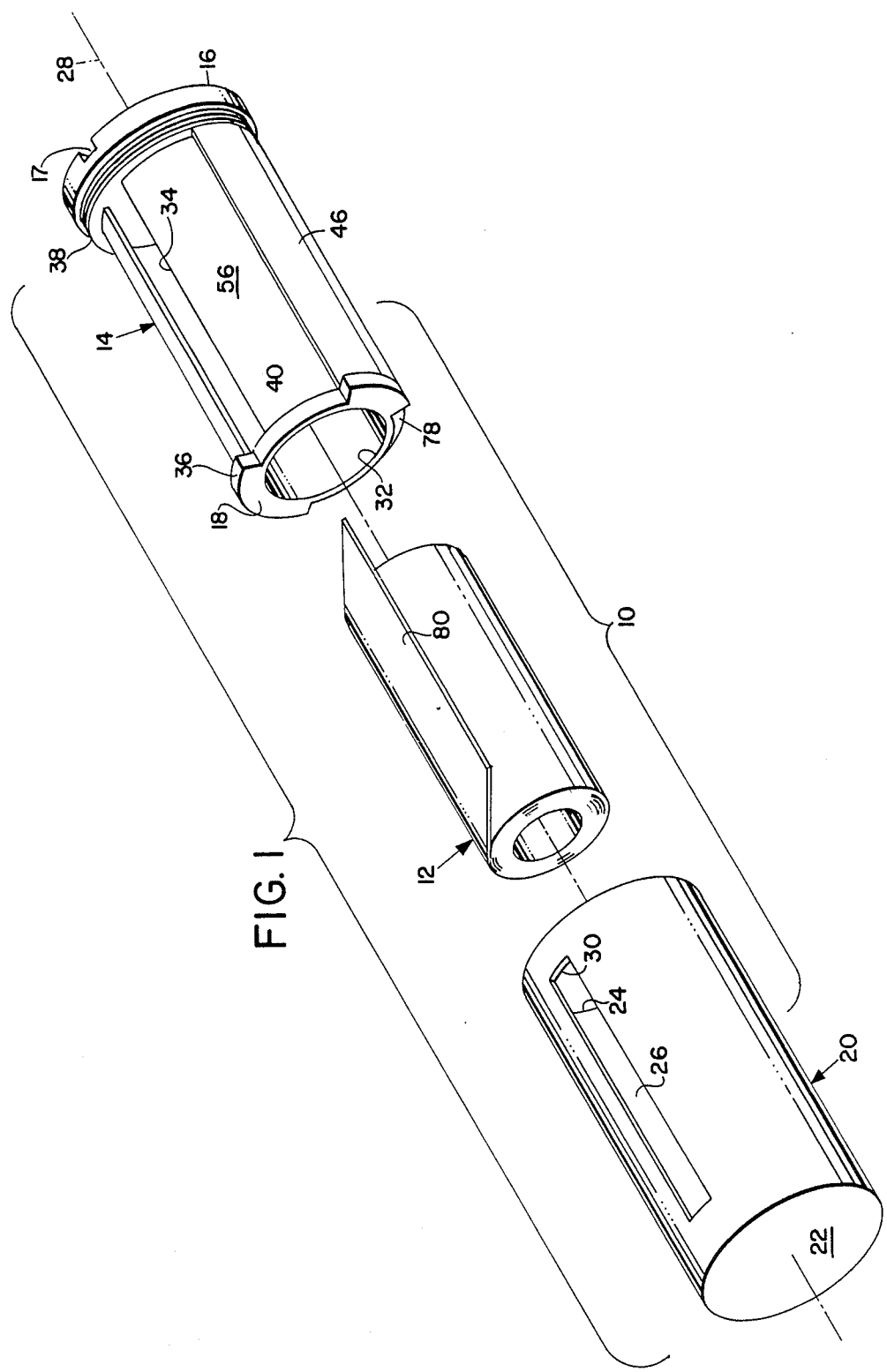
FIG. 1 is an exploded perspective view illustrating the components of a wet film strip retaining cassette in accordance with the present invention.

In FIGS. 1-6 of the drawings, a preferred embodiment of a wet film canister or cassette of the present invention is generally designated by the reference numeral 10 and is adapted to be loaded with and contain a coil of wet film strip 12 for manipulation in a camera environment to be described. The film component 12 is fully disclosed in the above-mentioned U.S. Pat. No. 3,907,563 and as such includes a generally resilient transparent support of mylar or similar material on which chemical materials incident to providing a positive image by diffusion transfer are coated as layers. These layers in turn are coated or impregnated with an alkaline liquid processing agent needed to carry out the diffusion transfer process when the coated layers on the transparent support are brought into face-to-face contact with an exposed negative. While the physical construction of the layered film component 12 is not illustrated in the drawings in light of the prior disclosure in the aforementioned U.S. Patent, it is adequate for a full understanding of the present invention to note that the film strip 12 is wound with the wet side facing inwardly. As a result of this winding orientation, the outside of the coil of the strip 12 is relatively dry and may be handled with ease.

The cassette 10 includes an inner receptacle 14 having closed and open ends 16 and 18 respectively, and an outer receptacle 20 similarly having a closed end 22 and an open end 24. While the exterior configuration of the outer receptacle 20 is completely cylindrical in the illustrated embodiment of FIGS. 1-6, it is contemplated that the outside shape of the receptacle 20 will vary considerably in practice depending on structural requirements of the camera or other photographic apparatus in which the cassette 10 is to be used. The inner surface 26 of the outer receptacle 20, however, is principally a cylinder concentric with the central cassette axis 28 with structural formations near the inside of an axially extending rectangular slot opening 30 and near the closed end 22. Such formations will be described in more detail below.

Figure 2:
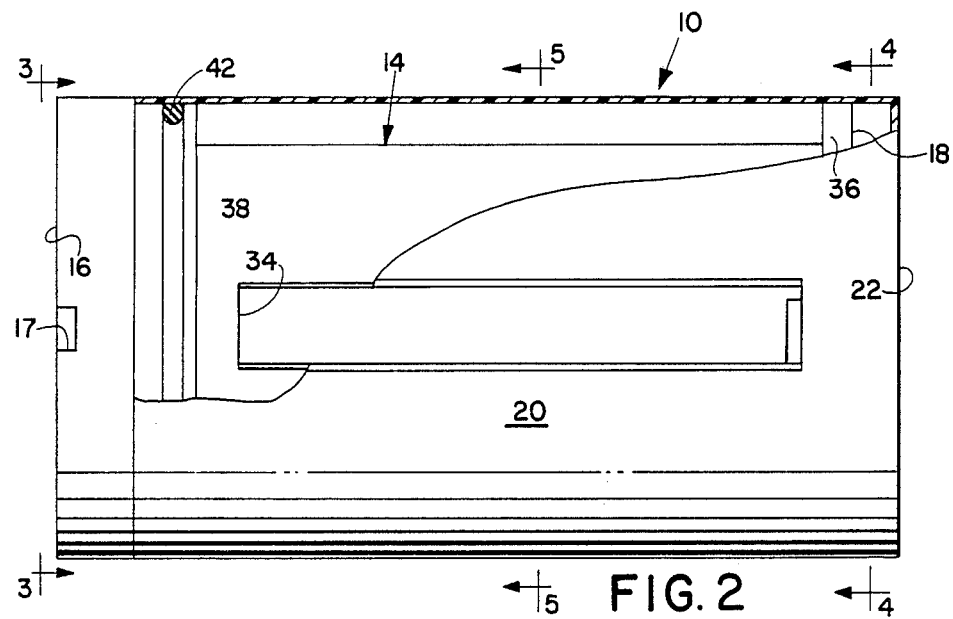
FIG. 2 is a front elevation in partial cross section illustrating the assembled cassette shown in FIG. 1.

The inner receptacle 14 is formed with a cylindrical inner surface 32 concentric with the central cassette axis 28 and extending from the open end 18 to the base or closed end 16. The outer surface configuration of the inner receptacle, however, is designed to provide a plurality of functional components which cooperate with the wet film coil 12 and with the outer receptacle 20 during use of the cassette 10 in practice. Thus, at opposite ends of a central region in the inner receptacle 14, defined axially by the length of a slot opening 34, a pair of circular journals 36 and 38 are provided. The journals 36 and 38 are concentric with the axis 28 and are of a diameter effective to support the inner receptacle 14 rotatably on the inner surface 26 of the outer receptacle 20. A peripheral notch or cutout 40 is provided in the journal 36 at the open end 18 to allow axial insertion of the inner receptacle 14 into the outer receptacle 20 without interference by internal formations about the slot 30 to be described. The diameter of the journal 38 at the closed end 16 of the inner receptacle 14 is formed with a peripheral groove to receive an O-ring seal 42. The O-ring 42 assures a fluid-tight, hermetic seal between the inner receptacle 14 and the inner surface 26 of the outer receptacle 24 when the two receptacles are assembled, as shown in FIG. 2 of the drawings, without restricting relative rotation of the inner and outer receptacles. Carried on closed end 16 is a tactile discontinuity such as an indent 17 which provides an external indication of the relative position of the slot 34 within the outer receptacle 20.

Figure 5:
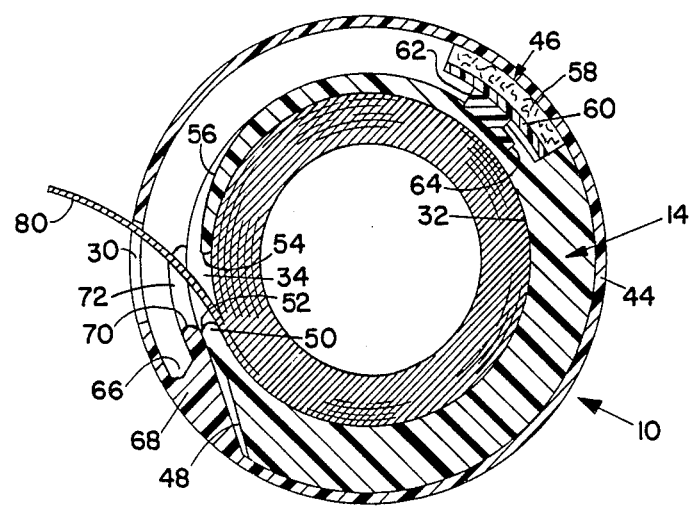
FIGS. 5 and 6 are cross sections taken on line 5—5 of FIG. 2 but illustrating components in different relative positions.
Figure 6:
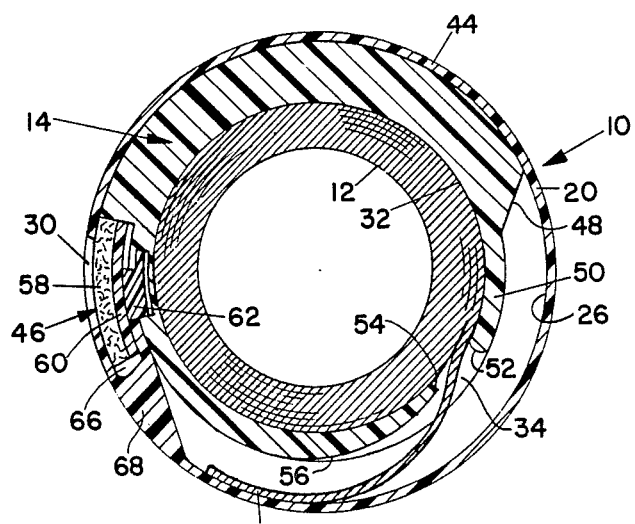

As may be seen most clearly in FIGS. 1, 5 and 6 of the drawings, the outside peripheral configuration of the inner receptacle 14 in the central region subtended axially by the slot 34 is in substantial part defined by a cylindrical surface 44 (FIGS. 5 and 6) of the same diameter as the journals 36 and 38. The surface 44 extends peripherally from a sealing bar 46 at one end to a chordal flat 48 at the other end. The flat 48 merges with a cylindrical wall portion 50 of reduced outside diameter and which, in turn, defines one lip 52 of the slot opening 34 in the internal receptacle 14. Another lip 54, on the opposite side of the slot 34 from the lip 52, is defined by a volute shaped external surface portion 56 of the internal receptacle 14. The volute-shaped surface portion 56 lies within a cylinder containing the outside of the wall 50 and extends to a point of maximum radius near the sealing bar 46.

The sealing bar 46 includes an outer elastomeric sealing pad 58 secured to a mounting bar 60 of generally T-shaped cross sectional configuration. The mounting bar includes a foot-like base formation 62 receivable in an undercut axial groove 64 in the outside of the inner receptacle 14. It is to be noted that the toe of the base formation 62 is of a radial dimension less than that of the undercut in the groove 64 so as to allow for limited radial movement or play between the sealing bar 46 and the inner receptacle 44. Also, the edge of pad 58 and mounting bar 60 facing the slot 34 is spaced radially from the volute surface 56.

Also as shown in FIGS. 5 and 6, the inside of the outer receptacle 20 is shaped to complement the sealing bar and the reduced diameter portion of the inner receptacle 14 angularly opposite from the cylindrical surface portion 44. In particular, a sealing bar containmnent trough 66 is defined by an internal formation 68 on the outer receptacle 20. The formation 68 establishes a lip 70 at the approximate angular position of one edge of the slot 30, the lip being of a length at least as long as the slot 30. A pair of arcuate projections 72 extend from the formation 68 at opposite axial ends of the slot 30. As a result of the trough 66 and of the arcuate projections 72, rotational movement of the inner and outer receptacles from the position illustrated in FIG. 5 to the position illustrated in FIG. 6 results first in positioning the elastomeric pad 58 of the ceiling bar 46 over the inside of the slot 30 in the outer receptacle 20 and secondly, in outward biasing of the elastomeric pad 58 against the inner perimeter of the slot. Moreover, with the sealing bar in the position shown in FIG. 6, elastomeric pad 58 and the O-ring seal 42 described previously assure complete sealing of the internal chambers within the cassette 10.

Figure 3:
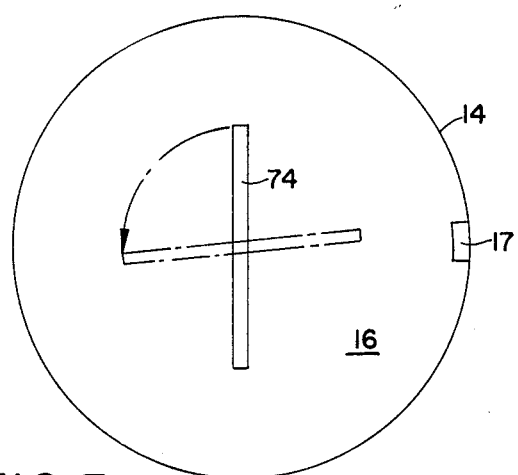
FIG. 3 is an end elevation as seen on line 3—3 of FIG. 2.
Figure 4:
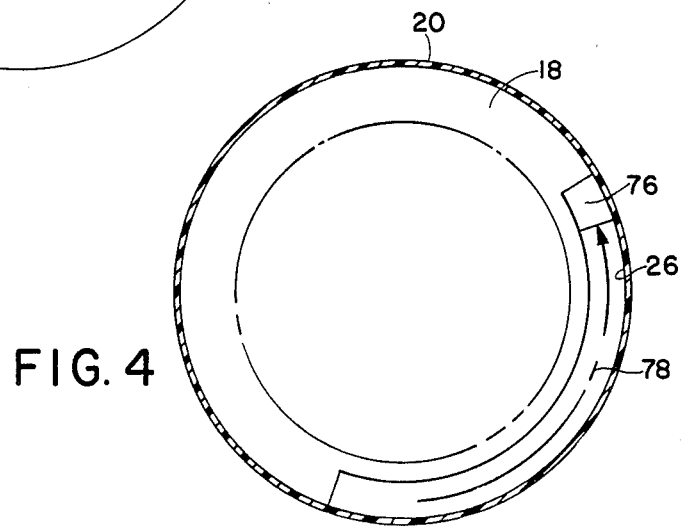
FIG. 4 is a cross section on line 4—4 of FIG. 2.

As shown in FIGS. 3 and 4 of the drawings, relative rotation of the inner and outer receptacles 14 and 20 between the positions shown in FIGS. 5 and 6 may be effected by retaining the outer receptacle 20 against rotation and by engagement of a camera mounted key (not shown) with a key slot 74 in the closed or base end 16 of the inner receptacle 14. Retention of the outer receptacle 20 against rotation may be effected by a similar key slot (not shown) or by a host of other exterior surface formations in the outer receptacle 20 which may engage with complementing formations in the camera or other photographic apparatus in which the cassette 10 is used.

To limit such relative movement between the inner and outer receptacles, and as shown in FIG. 4, the outer receptacle 20 is provided on its inner surface 26 with a radial lug 76. The lug 76 rides in an arcuate recess 78 formed at the open end 18 of the inner receptacle 14. As a result, opposite surfaces on the lug 76 abut opposite ends of the arcuate recess 78 to delimit the relative positions shown in FIGS. 5 and 6 of the drawings.

With reference again to FIG. 1 of the drawings, it will be noted that the cassette 10 is loaded with the wet film coil 12 simply by inserting the coil into the open end of the inner receptacle 14. When so inserted, the inherent resiliency of the wet film will effect a clock spring bias of the film outwardly against the inner cylindrical surface 32 of the inner receptacle 14. Once so inserted, the coil is rotatably manipulated relative to the inner receptacle so that a leading end 80 projects through the slot 34 of the inner receptacle 14. When depressed against the volute surface 56, the leading end will extend to the sealing bar 46. In this condition, the assembly of the coil 12 and the inner receptacle 14 is inserted into the outer receptacle 20 until the O-ring seal 42 near the closed end 16 of the inner receptacle is received fully within the outer receptacle 20 (see FIG. 2). The receptacles 14 and 20 are then rotated to the sealed position illustrated in FIG. 6 of the drawing.

As may be seen in FIG. 6, an annular chamber is defined between the inner surface 26 of the outer receptacle 20 and the volute surface 56 of the inner receptacle 14. Also it will be noted that the volute surface 56 is spaced from the formation 68 so as to provide a clearance slightly greater than the thickness of the wet film leader 80. Hence rotation of the inner receptacle relative to the outer receptacle 20, from the sealed condition of FIG. 6 to the opened condition of FIG. 5, will cause the leader 80, biased outwardly under its inherent resilience, to project through the opening 30 in the outer receptacle. The length of the leader, as determined by the distance between the slot 34 in the inner receptacle and the facing edge of the sealing bar 46, is adequate so that when the leader 80 projects from the cassette as shown in FIG. 5, it may be received in the nip between a pair of processing rollers and pulled from the cassette 10 in a manner to be described.

Prior to discussing the overall operation of the cassette, it should be noted that the resiliency or spring back of the film coil 12 is sufficient such that the coil bears against the inner surface 22 of the inner receptacle 14 and rotates with the latter to force the leader 80 through or withdraw it within the slot opening 30 of the outer receptacle 20. Hence, the coil 12 bearing against the surface 22 provides means for coupling the film strip to the inner receptacle 14 to allow it to advance the leader 80 from the cassette 12 and yet also permit subsequent withdrawal of the strip from the cassette 10. In effect, it provides a unidirectional coupling having sufficient force to carry the strip end 80 forward or backward with rotation of the receptacle, but of low enough force to provide minimum resistance to pulling of the strip from the receptacle.

In FIG. 7 of the drawings, a form of film transport system employing the cassette 10 of the present invention is schematically presented and intended for use in varied photographic apparatus. Though many camera components are omitted from the illustration in FIG. 7, it will be understood by those skilled in the art that a lens-formed light image may be folded by a mirror 82 to a focal plane in which a length of negative film strip 84 is maintained. The negative film strip is supplied from a light-tight cassette 86, separate from the cassette 10 in this instance, and pulled from the cassette 86 by a pair of feed rollers 88. The feed rollers 88 are driven by a controlled driving means (not shown) in a manner so that successive image frames may be drawn from the cassette 86 for exposure.

Downstream from the feed rollers 88, the negative film strip is directed by a stationary guide 90 through the nip of a processing roller pair 92. A cutoff knife 94 and anvil 96 are positioned between the feed rollers 88 and the guide 90. Though shown only schematically in FIG. 7, the cut-off knife 94 is preferably of a traversing roller type in which the knife 94 rotates across the width of the negative strip 84 and cooperates with the anvil 96 to shear the negative cleanly while it is retained against longitudinal movement.

The wet, positive film strip 12 is fed past a cut-off mechanism 98, of a type substantially identical to the cut-off mechanism represented by the knife 94 and the anvil 96, directly to the nip of the processing roller pair 92 which provide both pressure applying and advancing means for the strip 12 and the strip 84. Initial feeding of the wet film 12 to the nip of the processing roller pair 92 is effected by manipulation of the cassette in the manner described above with respect to FIGS. 5 and 6 of the drawings. In other words, the initially closed cassette 10 (FIG. 6) is operated to rotate the inner receptacle 14 from the closed position of FIG. 6 to the open condition of FIG. 5. In so doing, the leading end 80 of the wet strip 12 passes from the cassette to the nip of the pressure roller pair 92. Guide means, not shown, may be provided to guide the end 80 along an appropriate path to the rollers 92.

Once the two film strips are received between the processing roller pair 92, the feed roller pair 88 for the negative film strip 84 may be released so that the strip 84 and the wet strip 12 are drawn by and sandwiched together by the processing rollers 92 for a length approximating the length of an image frame previously exposed on the negative strip 84. At the appropriate time, the negative film strip 84 is cut by operation of the cutter 94 and 96 and the wet strip 12 is cut by the cut-off mechanism 98. These two cut-off mechanisms are operated so that the length of the negative sheet in the processed assembly of the negative strip 84 and the wet strip 12, as shown in FIG. 8, the negative strip 84 is longer to define marginal extensions on opposite end of the assembly so that the rollers 92 do not contact the wetted surface of the wet strip 12 and thus are not contaminated by the fluid carried thereon. In this manner, the negative strip 84 is advanced into the nip of the processing rollers 92 slightly in advance of the leading end of the wet strip 12 and the cut length of both may be adjusted accurately in accordance with the distance between the nip of rollers 92 and the respective cutters 94 and 98.

It should be noted that the length of the tongue 80 (FIGS. 5 and 6) is made long enough for its distal end to extend within the nip of rollers 92 when the inner receptacle 14 is rotated to align the openings 30 and 34. To accommodate the fact that the cutter 98 is located between rollers 92 and the cassette 10, and thus can produce a short tongue for subsequent images, means are provided for at least temporarily increasing the path length from the inner slot 34 to the rollers 92 in anticipation of the removal of the strip section between the cut-off mechanism 98 and the rollers 92. For example, the inner receptacle 14 is rewound or rotated backward a distance toward its sealed position prior to cutting of the wet strip 12 while the strip is held by the rollers 92.

A switch 99 cooperates with the indent 17 to allow this positioning of the inner receptacle 14 so that the added length of the strip extending from slot 34 will equal the distance between the cutter 98 and the nip of the rollers 92. Consequently, upon cutting of the strip 12, the tongue length as measured from the slot 34 in the inner receptacle 14 will equal the original tongue length.

Hence, the clockwise rotation of the inner receptacle 14 to move its slot 34 further from the rollers prior to cutting provides means for increasing the path length of the extended portion of the strip 12 in compensation for the length of the tongue to be removed in the cutting operation. Any of a number of ways of increasing this extended length will be suitable.

The indent 17 is carried by the receptacle 14 to make a cassette 10 a self-contained modular unit which merely requires an appropriate position of the switch 99 to accommodate the anticipated length of removed tongue, however, it should be understood that the slot 74, or the drive blade (not shown) which engages the latter could also be employed for signaling the appropriate length of reversal of the inner receptacle. Moreover, the latter may alternativly be provided under control of the exposure sequencing mechanism of the camera. Preferably, this displacement of the slot 34 along the wet strip 12 is accomplished just prior to cutting of the strip thereby maintaining both slots 30 and 34 in alignment during the drawing of the strip 12 from the cassette 10, however, the step of lengthening the strip path could occur at any point in the cycle (prior to cutting) once the wet strip is captured in the nip of the rollers 92. As described, the rollers 92 provide the force for holding the strip 12 as the path is lengthened, however, any means for holding the extended strip would be suitable. For example, portions of the cut-off mechanism 98 could grip and hold the strip, preferably its margins, while the path is lengthened, and then subsequently released.

Alternative arrangements for compensating for the shortening of this tongue length are also possible. For example, the complete cassette 20 could be slightly rotated clockwise or translated slightly away from the rollers 92 prior to the cutting step and then returned to its initial position for extension of the new tongue in a subsequent exposure and process cycle. A displaceable guide member (not shown) could alternatively urge the strip 12 into a deflected path to the cut-off mechanism 98.

Additionally, the system could carry a separate set of feed rollers located between the cassette 10 and the cutter 98. The initial length of the tongue would be equal to the length to the cutter 98, and the additional rollers would preferably be made to release the film once the tongue has reached the processing rollers 92, thereby permitting control to pass to the latter and the free withdrawal of the tongue at the end of each cycle. In this manner, the tongue remains the same length after each operation.

In operation of the camera apparatus, the cassette 10 is inserted in the camera as shown in FIG. 7 with its slot 74 engaged by a blade (not shown) of the camera drive. Initially, the slot position is as shown dotted in FIG. 7, and in this position the cassette 10 is sealed by location of the sealing pad 58 in engagement with the slot 30 in the outer receptacle 20 as shown in FIG. 6. The film cassette 86 is also inserted in the camera with a leader portion extending to the rollers 88. Upon the initial start of the camera, the leader is driven by the rollers 88 to rollers 92 and through them until a length of unexposed negative is presented to the image area defined by the mirror 82. The drive of the rollers is then stopped and the cutter 94 actuated to cut off the leader section so as to leave an appropriate length of negative film 84 in the exposure plane.

Subsequent to actuation of the exposure button (not shown), the camera apparatus operates through the following sequence. Initially, the shutter (not shown) is actuated to expose the negative 84, and the rollers 88 actuated to advance the end of the film 84 to the guide 90 and into the nip of the rollers 92. Then, the inner receptacle 14 is rotated counterclockwise to extend the tongue of the wet strip 12 to rollers 92 for engagement with the negative film 84. Rollers 92 are then actuated to advance the negative film 84 and the wet strip 12 into a superimposed relationship. This advancement continues until the trailing end of the desired length of negative film 84 reaches the cutter 94, at which point, rotation of the rollers 92 is temporarily stopped and receptacle 14 is then rotated clockwise until indent 17 engages the switch 94, at which time both cutter blade 94 and cutter 98 are actuated to sever the negative film 84 and the wet strip 12. Following this cutting step, the rollers 92 are again actuated to complete the film and strip sandwich and advancement of the compositie from these rollers. Finally, the camera cycle is completed by additional clockwise rotation of the receptacle 14 to withdraw the tongue of the wet strip within the outer receptacle 20 and to carry the sealing pad 58 into sealing position over the opening 30.

As described, the inner receptacle 14 carries sealing bar 46 so that the slot opening 34 is automatically sealed and unsealed in synchronism with retraction and extension of the tongue. While this arrangement is preferred, it should also be understood that the sealing function could also be provided by an external stopper and, although the simplicity of providing both functions may then be reduced, the advantage of retaining the end of the film within the cassette at all times except when in use would still be preserved.

In FIGS. 9-11 of the drawings, an alternative embodiment of the invention is illustrated in which parts corresponding to parts previously identified in FIGS. 1-8 are designated by reference numerals having the same tens and digits values, but in a "100" series. Parts not previously identified, but added to the embodiment of FIGS. 9-11 are designated by reference numerals between 100 and 110.

Thus in FIG. 9, an integrated cassette embodiment 100 is illstrated and which is similar to the cassette structures shown in the aforementioned copending U.S. application Ser. Nos. 747,899 and 747,901, in that the containers 100 and 186 for the positive and negative film components of the two component system are interconnected by a central tray-like section 102. In use, the negative film component 184 is trained from the housing 186 over the tray section 102 for successive frame exposures in the manner described above with respect to FIG. 7. Apart from the modification of the exterior conformation of the housing 10, it is substantially identical in construction to the cassette 10 described above with reference to FIGS. 1-6.

Because of space constraints in a camera (not shown) within which the cassette 10 is intended for use, the negative feed roll and cut-off assembly is omitted in the embodiment of FIGS. 9-10. Instead of a separate cut-off mechanism for the negative film component 184, the successive image frames on the film are delineated by perforated tear lines 103. As in the embodiment of FIG. 7, the length of each negative frame, delimited by successive tear lines, is slightly longer than the length to which the positive film strip 112 is cut by the cut-off mechanism 198. Thus, the initial training of the negative film strip 184 through the nip of the processing rollers may be effected by a dark sheet leader. Once in the camera, the first frame of the negative sheet 184 will be presented on the tray section 102 for a subsequent exposure, but with the leading end portion of the negative film strip between the nip of the processing roller pair. After exposure of the negative film strip 184, the internal receptacle 114 of the housing 110 is rotated to move the sealing bar to the position shown in FIG. 9 and to extend a leading portion 180 of the wet film strip 112 to the nip of the processing roller pair 192. When the processing rollers are driven, both the wet film strip 112 and the negative film strip 184 will be brought together in face-to-face contact for the length of the image frame to be formed. Just prior to reaching the end of the image area, the internal receptacle is rotated slightly clockwise and the positive film strip is severed with the processing rollers maintained in a stationary condition and the remainder of the wet film unit 112 is then pulled through the rollers 192 with the negative film strip 184. When a perforation 103 on the negative film strip reaches the nip of the processing roller pair, the exposed and processed portion of the negative film strip 184 will tear from the section of the negative strip 184 remaining between the processing roller pair.

As shown in FIGS. 10 and 11, it is preferred that the portions of the negative film strip 184 on opposite sides of the perforate tear lines 103 be provided with a very thin spacer or inert coating layer 104. In this way, very clean marginal edges will result at the leading and trailing edges of the positive film 112 on which the ultimate photograph is produced.

In the described preferred embodiment, the cassette 10 is supplied with a coil of wet film 12; however, it should be understood that the arrangement applies equally well to the negative film to minimize its exposure to the environment within the camera structure, and in fact, is applicable in any arrangement where intermittent dispensing of a strip and protection are desired.

Thus it will be appreciated that as a result of the present invention, a highly effective cassette and film transport system is provided by which the abovementioned objectives are completely fulfilled. It will also be appreciated by those skilled in the art, from the preceedintg description and accompanying drawing illustrations, that modifications and/or changes may be made in the disclosed embodiments without departure from the invention. It is expressly intended, therefore, that the foregoing description and accompanying drawing illustrations are illustrative of preferred embodiments only, not limiting, and that the true spirit and scope of the present invention be determined by reference to the appended claims.

What is claimed is:

1. A film cassette for use with photographic apparatus, said cassette comprising:
   an outer receptacle for defining a generally cylindrical chamber, said receptacle having an axially extending peripheral slot opening therein;
   a coil of film strip axially disposed within said chamber; and selectively operating means carried by said receptacle for advancing a leading end of said strip through said slot opening to the exterior of said receptacle for separation and use in the apparatus and for withdrawing any unused end portion of the strip back through said slot opening and within said outer receptable so as to reduce exposure of the withdrawn portion to the environment of the apparatus, said selectively operative means includes a generally cylindrical inner receptacle rotatably mounted within said outer receptacle and forming an annular chamber between its outer surface and the inner surface of said outer receptacle, said inner receptacle having an axially extending slot opening, said inner receptacle carrying said coil of said strip with the leading end thereof extending through the slot opening of the inner receptacle into said annular chamber between said inner and outer receptacle, and said outer receptacle carrying means for guiding said leading end of said strip through said slot opening of said outer receptacle upon rotation of said inner receptacle to advance said leading end of said strip to said slot opening of said outer receptacle.

2. The cassette of claim 1 wherein said selectively operative means includes means for unsealing and sealing said slot opening in correspondence with advancement through and withdrawal of said strip end from said slot opening.

3. A film cassette for use with photographic apparatus, said cassette comprising:
an outer receptacle for defining a generally cylindrical chamber, said receptacle having an axially extending peripheral slot opening therein;
a coil of film strip axially disposed within said chamber; and
selectively operative means carried by said receptacle for advancing a leading end of said strip through said slot opening to the exterior of said receptacle for separation and use in the apparatus and for withdrawing any unused end portion of the strip back through said slot opening and within said outer receptable so as to reduce exposure of the withdrawn portion to the environment of the apparatus. said selectively operative means includes an axially oriented sealing member displaceably mounted within said receptacle for movement between a first position in sealing engagement with the interior end of said slot opening and a second position displaced from said slot opening.

4. The cassette of claim 3 wherein said selectively operative means includes a rotatable member extending within the interior of said receptacle, said rotatable member carrying said sealing member and being coupled to said leading end of said strip such that upon rotation in one direction, said leading end of said strip is advanced toward and through said slot opening and said sealing member is displaced from its sealing position at said slot opening to an open position and upon rotation in an opposite direction, the end of said strip is withdrawn through said slot opening and said sealing member. is returned to its sea position.

5. The cassette of claim 4 wherein said rotatable member is a generally cylindrical inner receptacle having an axially extending slot opening, said inner receptacle being mounted within said outer receptacle in at least partially enclosing relation to a coil of said strip, with the leading end of said strip extended through said slot opening of said inner receptacle, and a sealing bar mounted on the interior surface of said inner receptacle in spaced relation to said slot opening thereof.

6. The cassette of claim 5 including means for defining an annular chamber between said inner and outer receptacles intermediate the ends thereof, the arcuate length of said annular chamber being established by the peripheral spacing of said axially oriented sealing member from said slot opening in said inner receptacle.

7. The cassette of claim 4 comprising means for mounting said sealing member on said inner receptacle for limited freedom of radial movement relative to said inner receptacle.

8. The cassette of claim 6 comprising trough means on the inside of said outer receptacle for retaining said sealing member against the inner perimeter of said slot opening in said outer receptacle.

9. A wet film cassette for two component film systems, said cassette comprising:
an outer receptacle for defining a generally cylindrical chamber having an open end, a closed end, and an axially oriented peripheral slot opening intermediate said ends;
a generally cylindrical inner receptacle having an open end, a closed end and an axially extending peripheral slot opening therein;
a coil of wet film mounted in said inner receptacle with a leading end extending through said slot opening therein;
means to support said inner receptacle within said outer receptaclefor relative rotation with the closed end of said inner receptacle adjoining said one end of said outer receptacle;
peripheral sealing means for sealing the closed end of the inner receptacle to the open end of the outer receptacle while permitting said relative rotation; and
an axially oriented sealing bar carried by said inne receptacle for rotatable movement between an open position, wherein said slot openings of said respective inner and outer receptacles are in registration, and a closed position about the perimeter of the slot opening in said outer receptacle.

10. The cassette of claim 9 including means for defining an annular chamber between said inner and outer receptacles intermediate the ends thereof for location of said leading end of said wet film when said sealing bar is in its said closed position, the arcuate length of said annular chamber being established by the peripheral spacing of said axially oriented sealing bar from said peripheral slot in said inner receptacle, and means for restricting relative rotation of said inner and outer receptacles to movement between said open and closed position of said axially oriented sealing means.

11. Apparatus for handling a diffusion transfer film system having initially separate wet and dry film components, said apparatus comprising:
means defining a processing nip for bringing a wet processing film and negative film together into face-to-face contact after exposure of said negative film to an image frame; and
a cassette for enclosing a supply of said wet processing film, said cassette comprising an outer receptacle for defining a generally cylindrical chamber, said receptacle having an axially extending peripheral slot opening therein, a coil of said wet processing film axially disposed within said chamber, and selectively operative means carried by said receptacle for advancing a leading end of said wet processing film through said slot opening to said processing nip for face-to-face contact with said negative film and for withdrawing any unused end portion of the wet processing film back through said slot opening and within said outer receptacle so as to reduce the drying out of the withdrawn portion.

12. The apparatus of claim 11 wherein said selective operative means includes a rotatable member extending within the interior of said receptacle and coupled to said wet processing film such that upon rotation in one direction, the leading end of said wet processing film is advanced toward and through said slot opening and upon rotation in an opposite direction, the end of said wet processing film is withdrawn through said slot opening.

13. The apparatus of claim 12 including cut-off means for severing a length of said wet web used to process an image frame, said cut-off means being located between said cassette and said processing nip, and further including means for extending the path of advancement between the coupling point of said rotatable member to said wet film prior to severing of said wet film so as to compensate for the severed length of wet film between said cut off means and said processing nip.

14. Apparatus for handline a diffusion transfer film system having initially separate wet and dry film components, said apparatus comprising:
means defining a processing nip for bringing said wet and dry film components together into face-to-face contact after exposure of an image frame; and
a cassette for sealably enclosing a supply of said wet film component, said cassette comprising an outer receptacle having a wet film exit opening in fixed relationship to said processing nip and an inner receptacle for receiving a coil of said wet film component, said inner receptacle having a slot opening through which a leading end portion of said wet film component extends and defining with said outer receptacle an annular chamber to enclose said leading end portion, a sealing bar mounted on said inner receptacle and spaced peripherally from said slot opening at least by the length of said leading end portion, said inner receptacle being rotatably mounted within said outer receptacle for movement between a closed position in which said leading end portion of the wet web is within said annular chamber and said sealing bar is closed on the exit opening of said outer receptacle, and an open position in which said leading end portion of the wet film is projected through the exit opening of the outer receptacle to said processing nip.

15. A photographic process comprising the steps of:
providing a roll of wet processing strip within a sealed container having a longitudinal slot sealed by a displaceable sealing member;
exposing an image over a given length of a photosensitive film strip;
displacing the sealing member to open the slot in the container and advancing a leading end of the roll of processing strip through the slot and out of the container;
engaging the leading end of the exposed film strip and the processing strip and drawing both strips into face-to-face contact over the given length of the exposed image so as to develop an image in the combined film strip and processing strip;
separating a section of the extended processing strip at a point spaced from the container to provide a section of processing strip approximately equal to the given length of the exposed image; and
withdrawing the remaining extended portion of the processing strip back into the container and returning the sealing member to its original position to seal the container slot and thereby maintain the roll of processing strip in a sealed environment.

16. The process of claim 15 wherein the container includes a pivotal member engaging the processing strip and carrying the sealing member, and the displacing and advancing step includes rotating the pivotal member to displace the sealing member away from the slot and for advancing the leading end of the processing strip therethrough.

17. The process of claim 15 wherein the displacing and sealing step includes simultaneously advancing the leading end of the processing strip toward the slot as the sealing member is displaced therefrom.

18. The process of claim 15 wherein the engaging and drawing step includes advancing the strip through a pair of pressure applying members to provide the face-to-face contact, and additionally including providing an overall length of the film strip exceeding the given length of image, advancing the film strip and processing strip into face-to-face contact with the leading end of the processing strip engaging the film strip just short of its leading end and separating the processing strip from its roll at a point on the processing strip prior to contact with the film strip to form a length of the processing strip at least equal to the given image length, but less than the overall length of the film strip such that the leading and trailing ends of the section of film strip which extend beyond the length of the processing strip protects the pressure applying members from contact with then wet side of the processin strip.

19. The process of claim 15 wherein both the strips are advanced in face-to-face contact through a pair of pressure applying members, and the separating step includes separating the given length of the processing strip at a point spaced between the pressure applying members and the container slot prior to complete advancement of the processing strip into contact with the film strip so as to permit withdrawal of an unused extended portion of the processing strip back into the container.

20. The process of claim 15 wherein the engaging and drawing step includes engaging the extended processing strip at a point spaced a given distance along a given path from the container, the displacing and advancing step includes displacing the leading end of the processing strip along the given path to the point of engagement for subsequent drawing of the processing strip from the container, the separating step includes separating the processing strip at a point intermediate the container and the point of engagement, and the process additionally includes the step of temporarily increasing the length of the given path to the point of engagement prior to the separating step by an amount substantially equal to the path length between the point of separating and the point of engagement so that the remaining extended portion withdrawn into the container will be of a length capable of reaching the point of engagement over the initial given path in the processing of a subsequent image.

21. A film cassette for use with photographic apparatus, said cassette comprising:

an outer receptacle for defining a generally cylindrical chamber, said receptacle having an axially extending peripheral slot opening therein;

a coil of film strip axially disposed within said chamber; and selectively operative means carried by said outer receptacle for advancing a leading end of said strip through said slot opening to the exterior of said receptacle for the separation and use of a section of the strip by the apparatus and for withdrawing any unused end portion of the strip back through said slot opening and within said outer receptacle; and means for unsealing and sealing said slot opening in correspondence with advancement to and withdrawal of said strip end from said slot opening so that the coil of film strip including the unused end portion is sealably retained within said outer receptacle intermittent the use of portions thereof by the apparatus.

22. The cassette of claim 21 wherein said selectively operative means includes a generally cylindrical inner receptacle rotatably mounted within said outer receptacle and forming an annular chamber between its outer surface and the inner surface of said outer receptacle, said inner receptacle having an axially extending slot opening, said inner receptacle carrying said coil and having said leading end of said strip extending through the slot opening of the inner receptacle into said annular chamber between said inner and outer receptacle, and said outer receptacle carrying means for guiding said leading end of said strip through said slot opening of said outer receptacle upon rotation of said inner receptacle to advance said leading end of said strip to said slot opening of said outer receptacle.

23. The cassette of claim 22 wherein said means for unsealing and sealing includes an axially oriented sealing member carried by said inner receptacle for movement between a first position in sealing engagement with the interior end of said slot opening and a second position displaced from said slot opening in accordance with rotation of said inner receptacle to advance said leading end of said strip through said slot opening of said outer receptacle.

* * * * *